US010809828B2

(12) United States Patent
Weiss

(10) Patent No.: US 10,809,828 B2
(45) Date of Patent: Oct. 20, 2020

(54) INTERACTIVE DRAWING TABLET FOR LOCATING COLOR ZONES ON COLORING SHEETS

(71) Applicant: Stephen Weiss, Easton, PA (US)

(72) Inventor: Stephen Weiss, Easton, PA (US)

(73) Assignee: Stephen Weiss, Easton, PA (US)

( * ) Notice: Subject to any disclaimer, the term of this patent is extended or adjusted under 35 U.S.C. 154(b) by 21 days.

(21) Appl. No.: 16/183,085

(22) Filed: Nov. 7, 2018

(65) Prior Publication Data
US 2019/0138118 A1  May 9, 2019

Related U.S. Application Data

(60) Provisional application No. 62/582,574, filed on Nov. 7, 2017.

(51) Int. Cl.
G06F 3/038 (2013.01)
G06F 3/16 (2006.01)
G06F 3/0354 (2013.01)
G06F 3/03 (2006.01)
G06K 7/14 (2006.01)
G06K 19/06 (2006.01)
B43L 3/00 (2006.01)
G06F 3/0484 (2013.01)
G06F 3/042 (2006.01)

(52) U.S. Cl.
CPC ............ G06F 3/0383 (2013.01); B43L 3/00 (2013.01); G06F 3/0308 (2013.01); G06F 3/03542 (2013.01); G06F 3/042 (2013.01); G06F 3/04845 (2013.01); G06F 3/16 (2013.01); G06K 7/1413 (2013.01); G06K 19/06028 (2013.01)

(58) Field of Classification Search
CPC ...... G06F 3/042; G06F 3/0421; G06F 3/0428; G06F 3/0304; G06F 3/0308; G06F 3/03542; G06F 3/03386
See application file for complete search history.

(56) References Cited

U.S. PATENT DOCUMENTS

2008/0043001 A1* 2/2008 Perkins ............... B43K 21/033
                                                      345/179
2009/0141001 A1* 6/2009 Kuroda ............. G02F 1/13338
                                                      345/175
2013/0344771 A1* 12/2013 Moll ..................... G06K 9/222
                                                      446/484

OTHER PUBLICATIONS

Xiomara Blanco, "Top tablets with expandable storage", Jan. 25, 2016, cnet.com (Year: 2016).*

* cited by examiner

Primary Examiner — Dong Hui Liang
(74) Attorney, Agent, or Firm — Gerald E. Hespos; Michael J. Porco; Matthew T. Hespos

(57) ABSTRACT

An interactive drawing tablet is provided having a housing and at least one surface on which printed media is mounted. A delivery device is electrically coupled to the interactive drawing tablet and is configured to hold a writing implement. An array of emitters are embedded in the surface and configured to emit signals. The delivery device is configured to receive the signals from the emitters when the delivery device is brought into proximity to the individual emitters and thereby determine a location on the printed media. The interactive drawing tablet is equipped with a speaker for emitting audio media to the user of the tablet. The interactive drawing tablet provides a user with instructions as to actions that should be taken with respect to the printed media.

16 Claims, 17 Drawing Sheets

INTERACTIVE DRAWING TABLET FOR LOCATING COLOR ZONES ON COLORING SHEETS

This application claims priority on U.S. Provisional Application No. 62/582,574 filed on Nov. 7 2017, the entire disclosure of which is incorporated herein by reference.

FIELD OF THE INVENTION

The present disclosure generally relates to coloring media, such as those from a coloring book and other coloring surfaces. More particularly, the present disclosure relates to electronic devices for locating interactive zones on a coloring sheet.

BACKGROUND

For decades, children of all ages have enjoyed using their artistic and fine motor skills to color the pictures in coloring books. Conventional coloring books include pictures printed on blank pages, where the pictures simple include the outline of various objects, characters, and shapes. Children may fill in the spaces or zones that are formed within the outline with various colors using crayons, markers, paint, pencils and other materials.

More recently, children have begun using electronic devices to learn rudimentary skills. Children use electronic tablets, smart phones, and other dedicated devices to watch shows and educational media and to play interactive games. The media available through these applications can help teach a child to read, spell, solve mathematical equations, and to engage in various other educational endeavors.

While electronic devices can aid children in some educational activities, the development of certain skills can be suppressed by an overreliance on electronic devices and applications. For instance, many educational applications are either passive in that a child merely watches a presentation on a screen. Alternatively, "interactive" applications merely require a child to touch an area of the screen. As a result, development of fine motor skills is suppressed. Further, while coloring and painting applications exist for popular tablets, the applications are often structured so that a child touches a portion of a screen and said portion changes to a designated color. A reliance on these apps can suppress a child's creative and artistic development.

As a result of the above-discussed deficiencies in educational and artistic based applications for children, many parents and educators still consider coloring books to be one of the most effective means of developing a child's artistic and fine motor skills. However, traditional coloring books lack the engaging and interactive qualities children have become accustomed to through regular use of electronic device.

In view of the above, it is an object of the invention to provide an interactive and engaging drawing, coloring, and painting experience for children.

It is a further object of the invention to provide an electronic device that combines traditional drawing, coloring, and painting skills with an interactive instruction-based program for children.

SUMMARY OF THE INVENTION

The present invention is directed to coloring media, including coloring sheets and surfaces, such as those that may be used in a coloring book, and devices for electronically determining location information with respect to the images on the coloring sheets. Coloring information, such as choice of color, can be provided to a user. For example, by positioning a stylus in a location with respect to the image on the coloring sheet, the location within the image can be compared with pre-stored information that asks the user what color they might choose for coloring that particular location. This immersive and interactive drawing, coloring and painting experience interaction can then be communicated to the user using a speaker or other output device.

An interactive drawing tablet is provided having a housing defined by a frame and having at least one interactive surface. Printed media is placed on the at least one surface. A page identification device is formed on the interactive drawing tablet and identifies the printed media by reading a barcode on the printed media or by other known means. Information relating to the print media, such as the image printed thereon, color information, and location zone information is stored in a removable memory module that is received in a memory port formed on the tablet. Alternatively, the information relating to the printed media may be stored in a memory of the interactive device or transmitted thereto.

The interactive drawing tablet includes a delivery system for drawing or coloring on the printed media. The delivery system is configured to communicate with the interactive drawing device either through a tether having electrical communication components or through wireless communication. The delivery system includes a holding portion for holding a writing or drawing implement, such as a crayon, pen, pencil, marker, or paint brush. The delivery system is also provided with an optical channel configured to identify and receive signals emitted from the interactive drawing tablet. The optical channel communicates with an integrated circuit housed in the delivery device.

An array of emitters are embedded in or below the surface of the interactive drawing tablet. The optical channel of the delivery device receives the signal from the emitters. The emitters are preferably arranged in a 2 dimensional array in an X-Y arrangement. The emitters 48 are coupled to a circuit and processor of the interactive drawing tablet. The emitters emit a signal through the printed media arranged on the surface. The delivery system is configured to operate in conjunction with the emitters to receive the signal from the emitters, so that the interactive drawing tablet can determine the location of the delivery system with respect to emitters and a zone of the coloring sheet corresponding to the emitters.

Furthermore, the interactive drawing tablet includes a speaker or other output device. The speaker emits audio media to engage the user in an interactive coloring experience. For example, when the user handles the delivery system and touches or points the delivery system at a location on the coloring sheet that has been placed on the surface of the interactive drawing tablet, audio media instructs the user as to appropriate action to take with respect to the location identified by the stylus.

The interactive drawing tablet includes location detecting mechanisms for detecting the location of the delivery system with respect to the printed media. The audio media is emitted from the speakers based on the location detecting mechanisms identification of the positioning of the delivery system. For example, the audio media may give verbal instructions with respect to action the user should take with regard to the printed media.

BRIEF DESCRIPTION OF THE DRAWINGS

The features and components of the following figures are illustrated to emphasize the general principles of the present disclosure and are not necessarily drawn to scale. Corresponding features and components throughout the figures may be designated by matching reference characters for the sake of consistency and clarity.

DETAILED DESCRIPTION

The present invention is directed to coloring media, including coloring sheets and surfaces, such as those that may be used in a coloring book, and devices for electronically determining location information with respect to the images on the coloring sheets. Coloring information, such as choice of color, can be provided to a user. For example, by positioning a stylus in a location with respect to the image on the coloring sheet, the location within the image can be compared with pre-stored information that asks the user what color they might choose for coloring that particular location. This immersive and interactive drawing, coloring and painting experience interaction can then be communicated to the user using a speaker or other output device.

Figure 1:
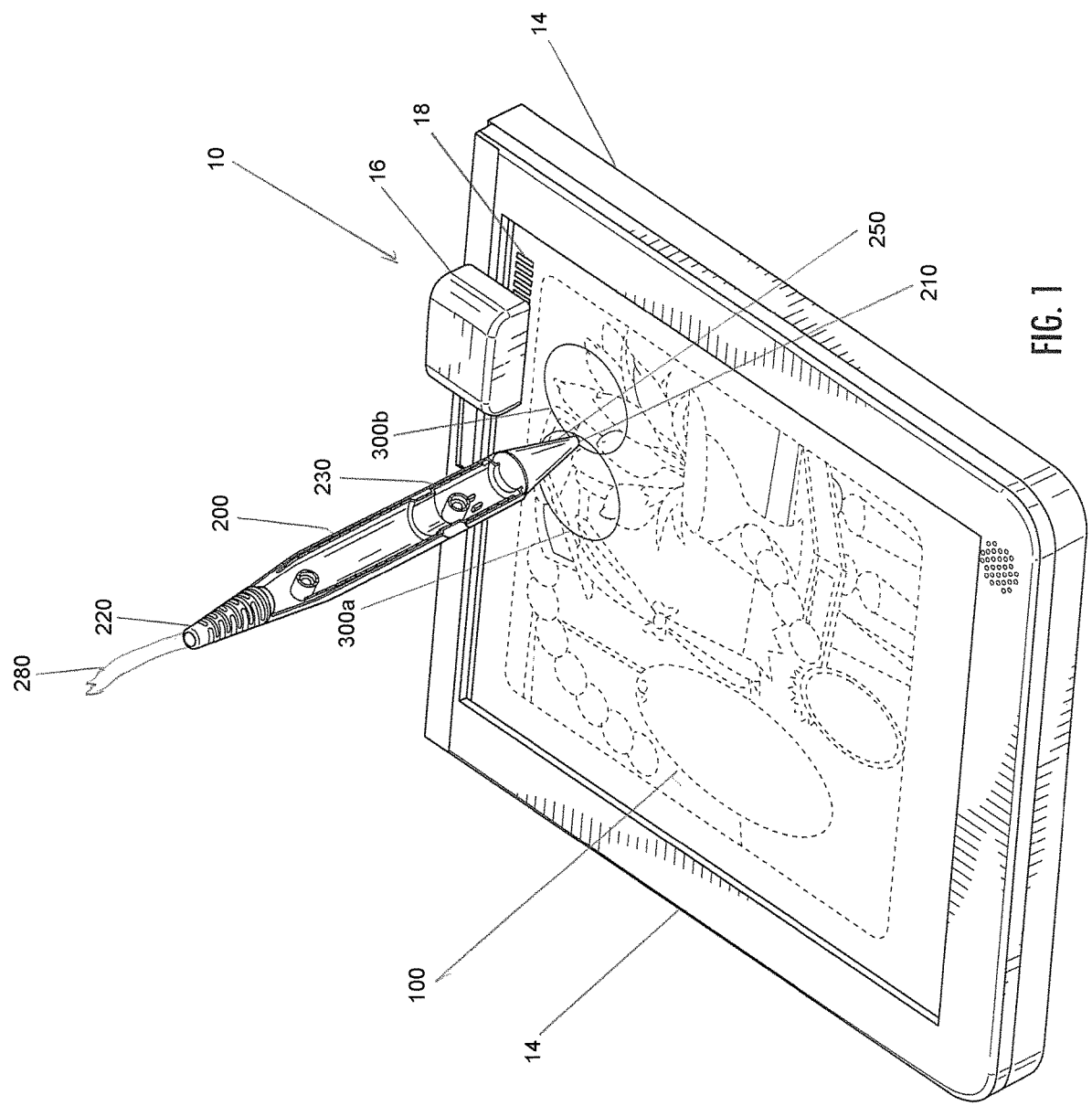
FIG. 1 is a perspective view of an interactive drawing tablet according to an embodiment of the present invention.
Figure 2:
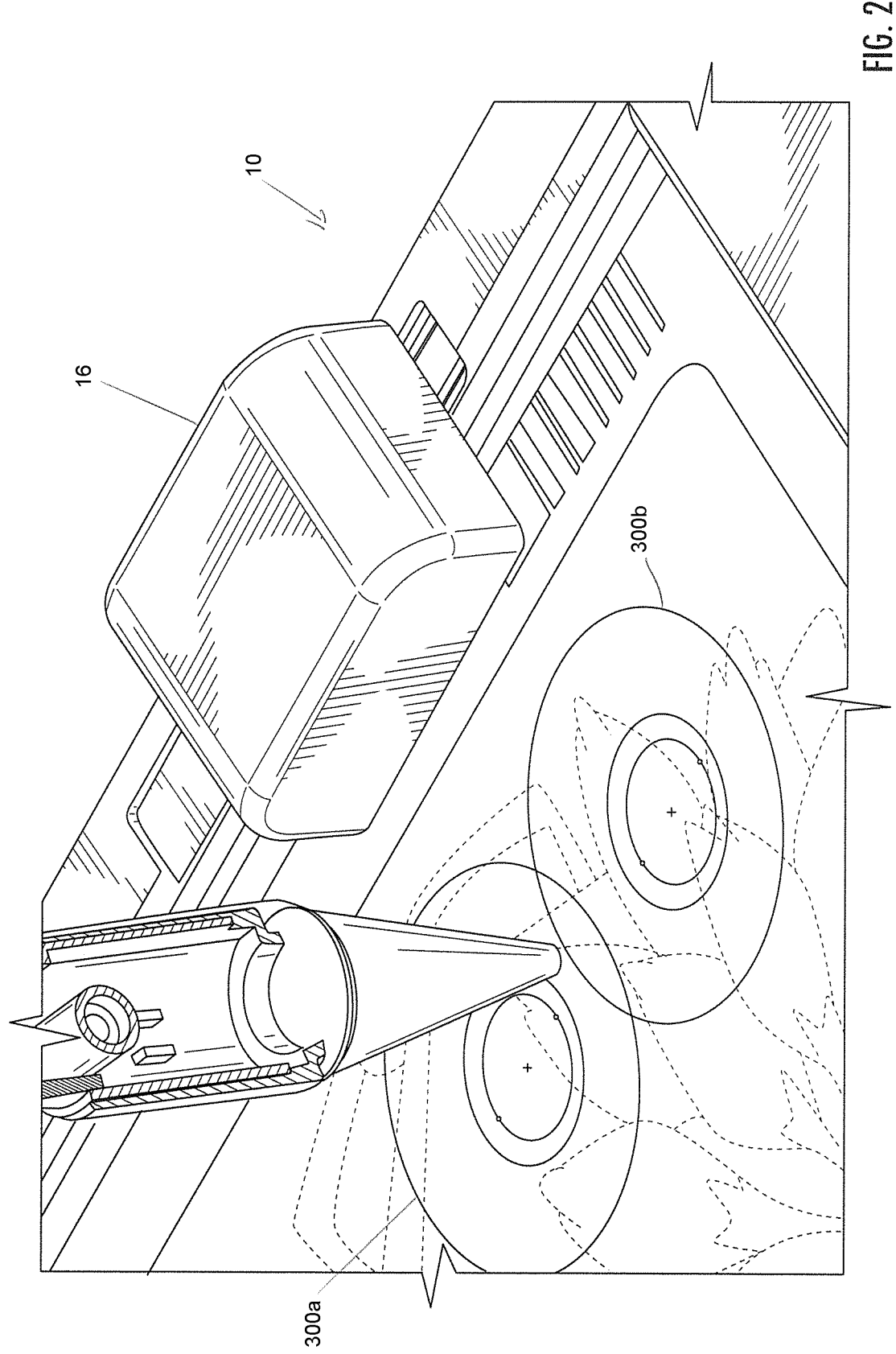
FIG. 2 is a perspective view of a portion of the interactive drawing tablet showing a page identification device.

FIG. 1 is a view of an embodiment of an interactive drawing tablet 10. As shown in FIG. 1, printed media 100 has been placed on a surface 12 of a housing of the coloring tablet 10. In the illustrated embodiment, the printed media 100 is a coloring sheet 100. However, the printed media 100 may comprise any type of printed media or material. the surface 12 on which the coloring sheet 100 has been placed is substantially planar. However, the surface may be curved or otherwise uneven. For instance, ridges or valleys may be formed in the surface 12 to give the appearance of depth to the images on the coloring sheet 100. Further, the surface 12 may be flexible so that the user may determine the contours of the surface 12. In another embodiment, the interactive drawing tablet 10 may be a three dimensional device with a plurality of surfaces 12 configured for interactive drawing, coloring and painting in accordance with the following description.

The interactive drawing tablet 10 includes a frame 14 having edges that contain the coloring sheet 100 in a substantially fixed position on the surface 12. In some embodiments, securing devices, such as clips, corner-page supports, or other suitable device, can be used to keep the coloring sheet 100 in a fixed position within the frame 14. The coloring sheets 100 and frame 14 can be designed to have length and width dimensions such that the coloring sheets 100 easily fit within the edges of the frame 14. When the coloring sheet 100 is placed on the surface 12, the images on the coloring sheet 100 will be located at an identifiable position with respect to the surface 12. It should also be noted that coloring sheets 12 printed with each particular picture will be printed such that the images are at a known location on the page and therefore at a known location with respect to the surface 12.

The coloring tablet 10 also includes a page-identification device 16. In the illustrated embodiment, the page-identification device is a barcode reader 16 configured to read a barcode 18 or other encoded symbol printed on the coloring sheet 100. Alternatively, the page-identification device may be an optical scanner that identifies a corresponding identification feature on the coloring sheet 100. The barcode 18 may be printed near a top edge of the coloring sheet 100 corresponding to a known location where the barcode reader 16 will be located on the coloring tablet 10. As shown in FIGS. 1-6, the page identification device 16 is slidably-coupled to the frame 14 at the upper corner of the interactive drawing tablet 10. The page identification device 16 is slid in a direction parallel to the portion of the frame 14 on which it is coupled to scan the barcode 18. However, the page identification device 16 may be formed at other areas of the interactive drawing tablet 10. The page identification device 16 may be left in an off state until it is slid along a groove 20 at which time power is delivered to the page identification device 16 to read the barcode 18. Alternatively, the page identification device 16 may be stationary with respect to the interactive drawing tablet 10 in a permanently powered state or may be activated upon the introduction of a coloring sheet 100 to the tablet 10. Further, the page identification device 16 may be configured to scan the barcode 18 when the user presses a button or activates a switch (not shown). The interactive drawing tablet 10 is compatible with multiple coloring sheets 100, each of which has a different image. A dedicated barcode 18 is printed on each of the different coloring sheets 100 so that the interactive drawing tablet 10 can easily identify and provide instructions based on the content of the selected coloring sheet 100 and audio media associated therewith. Therefore, when a barcode is obtained by the barcode reader 16, a look-up table stored in the memory of the interactive drawing tablet 10, in an external memory device such as a disc or flash drive, or via a wireless communication process can be read to match the identity of the coloring sheet 100 and the audio media associated therewith with the barcode information. The identity of the coloring sheet 100 can also be used for obtaining other information, as discussed in more detail below.

In addition, the interactive drawing tablet 10 may also include a delivery system 200 for drawing or coloring on the coloring sheet 100. The delivery system 200 includes opposed first and second ends 210, 220. In the preferred embodiment, a tether 280 extends between the second end 220 and the interactive drawing tablet 10, the tether 280 including electrical conductors for conducting electricity to the delivery system 200. In other embodiments, the delivery system 200 may be untethered. When untethered, the delivery system 200 may be powered by one or more batteries and may include a short range wireless communication device for transmitting signals received by the delivery system 200 to the interactive drawing tablet 10, as explained in more detail below. In operation, the user may use the delivery system 200 to point to specific locations of images on the coloring sheet 100.

The first end 210 of the delivery system 200 preferably includes a holder 230 for holding a drawing or writing implement 250. The drawing or writing implement 250 can include, but is not limited to, pencils, pens, ink markers, paint brushes, and crayons. The holder 230 is configured to allow a user to interchange between a variety of drawing or writing implements 250 to choose an appropriate instrument and appropriate color.

The delivery system 200 has coupled thereto an infrared receiving integrated circuit 240. The integrated circuit 240 may be held in the delivery system 200 or may be disposed in the interactive drawing tablet 10 and electrically or electromagnetically coupled to the delivery system. The delivery system 200 is further provided with an optical channel 260 coupled to the integrated circuit 240. In some embodiments, the optical channel 260 passes through an opening or channel in the writing implement 250. Alternatively, the optical channel 260 may be arranged parallel to and offset from the writing implement 250.

Figure 17:
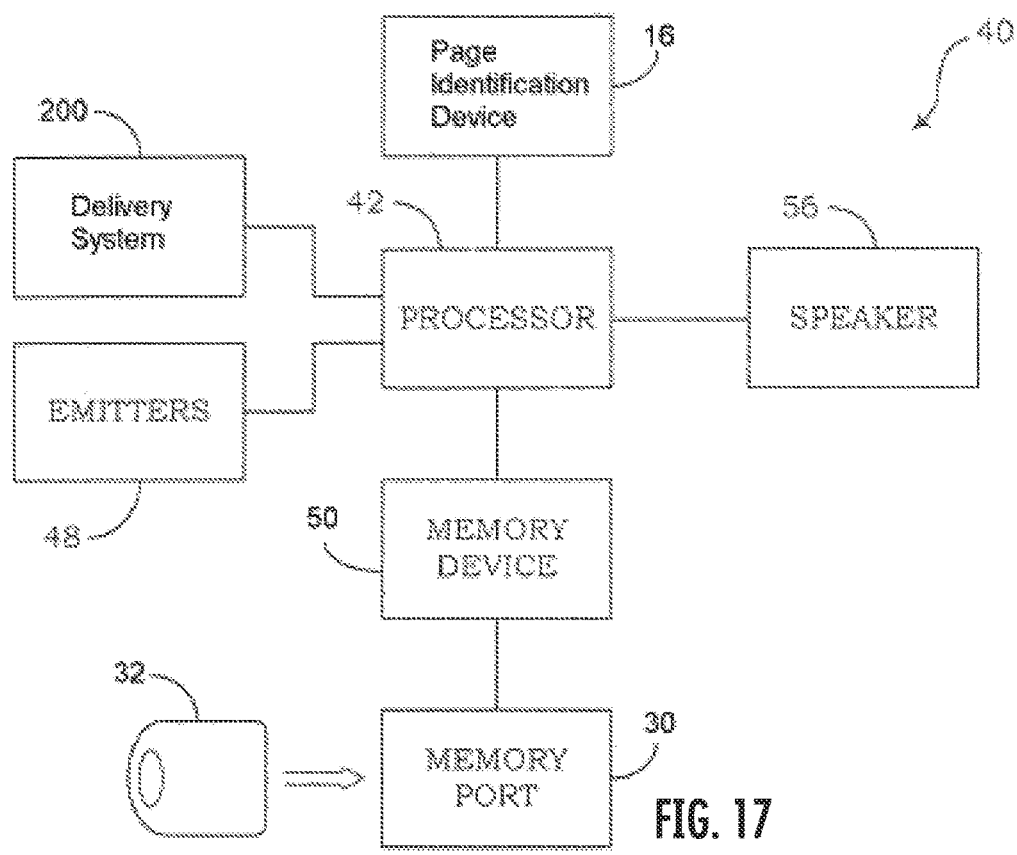
FIG. 17 is a schematic representation of a circuit of the interactive drawing tablet.

FIG. 17 is a block diagram showing an embodiment of a circuit 40 of the interactive drawing tablet 10. The circuit 40 may be contained within a housing of the interactive drawing tablet 10. The circuit 40 includes a processor 42 or other type of processing or computing device for performing multiple logic functions. The circuit 40 may include a number of input devices, such as the page identification device 16 for reading the barcode printed on the coloring sheets 100. The page identification device 16 and related decoding circuitry is used to identify the specific coloring sheet 100 that is placed on the surface of the coloring tablet 10. Some or all of the barcode decoding steps may be executed by the processor 42.

The delivery system 200 is configured to receive signals from an array of emitters 48 embedded in or below the surface 12 of the interactive drawing tablet 10. In particular, the optical channel 260 receives the signal from the emitters 48. Preferably, the emitters 48 are a 2 dimensional array of emitters provided in an X-Y arrangement coplanar with the surface 12 of the interactive drawing tablet 10. The emitters 48 are coupled to the circuit 40 and processor 42. The emitters 48 receive a signal from the circuit 40 and/or processor and emit a signal through the coloring sheet 100 or other media arranged on the surface 12. The delivery system 200, or other suitable point-location identify device, is configured to operate in conjunction with the emitters 48 to receive the signal from the emitters 48, so that the interactive drawing tablet 10 can determine the location of the delivery system 200 with respect to emitters 48 and the zone of the coloring sheet 100 corresponding to the emitters 48. In some embodiments, each emitter 48 emits a unique signal that the delivery system 200 detects when it receives said unique signal.

In some embodiments, the array of emitters 48 is a two-dimensional array of infrared radiators (e.g., IR LEDs) or emitters 48 with a specific half power beam angle (radiation pattern) and a specific forward current (radiated power). The IR LEDs may be addressed individually and/or simultaneously. Each IR LED radiates a unique code modulated with a carrier wave. In the case of the current embodiment, the carrier wave may be 38 kHz.

Furthermore, the interactive drawing tablet 10 includes a speaker 26 or other output device. The speaker 26 emits audio media to engage the user in an interactive coloring experience. For example, when the user handles the delivery system 200 and touches or points the delivery system 200 at a location on the coloring sheet 100 that has been placed on the surface 12 of the interactive drawing tablet 10, audio media instructs the user as to appropriate action to take with respect to the location identified by the stylus.

The interactive drawing tablet 10, the delivery system 200, or the memory module 32 may be equipped with an audio recording function. In this regard, a user of the interactive drawing tablet 10 may record their own voice when pointing the delivery system 200 at a particular zone of the coloring sheet 100. The device is also equipped with a playback function so that the recording is played back when the zone is identified by the delivery system 200.

The interactive drawing tablet 10 includes location detecting mechanisms for detecting the location of the delivery system 200 with respect to the coloring sheet 100. The audio media is emitted from the speakers 26 based on the location detecting mechanisms identification of the positioning of the delivery system 200. For example, with reference to the coloring sheet 100 shown in the drawings, the audio media may ask the user "What color is the flower?" The audio media may be configured according to various embodiments to provide verbal instructions in one or more languages.

The interactive drawing tablet 10 may also include a material support section 60. The material support section 60 may be configured to hold or support coloring instruments such as crayons, markers, paint brushes, etc. and/or to hold or support coloring materials such as paints, ink, etc.

Figure 3:
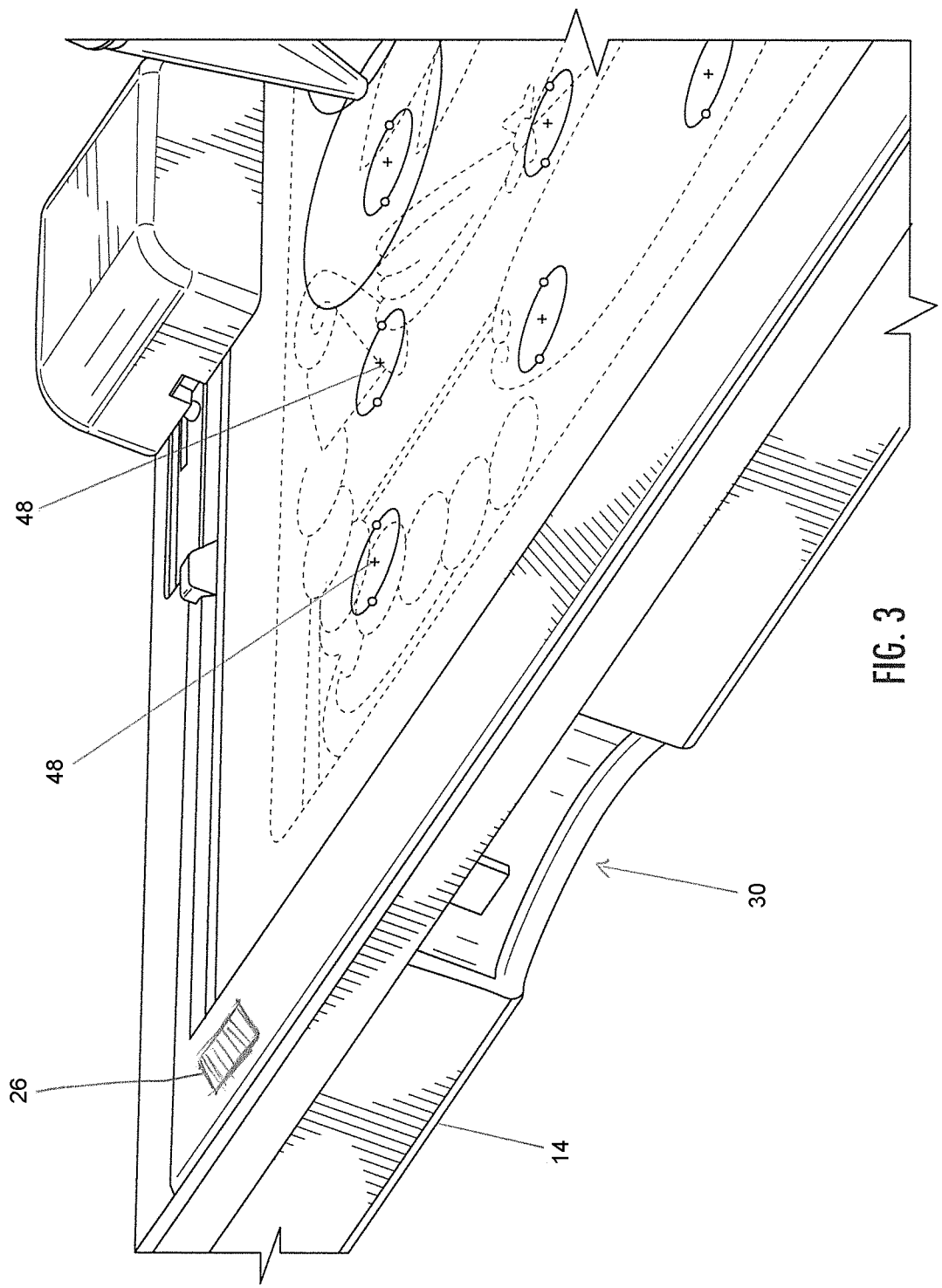
FIG. 3 is a side perspective view of a portion of the interactive drawing tablet showing a memory port.
Figure 4:
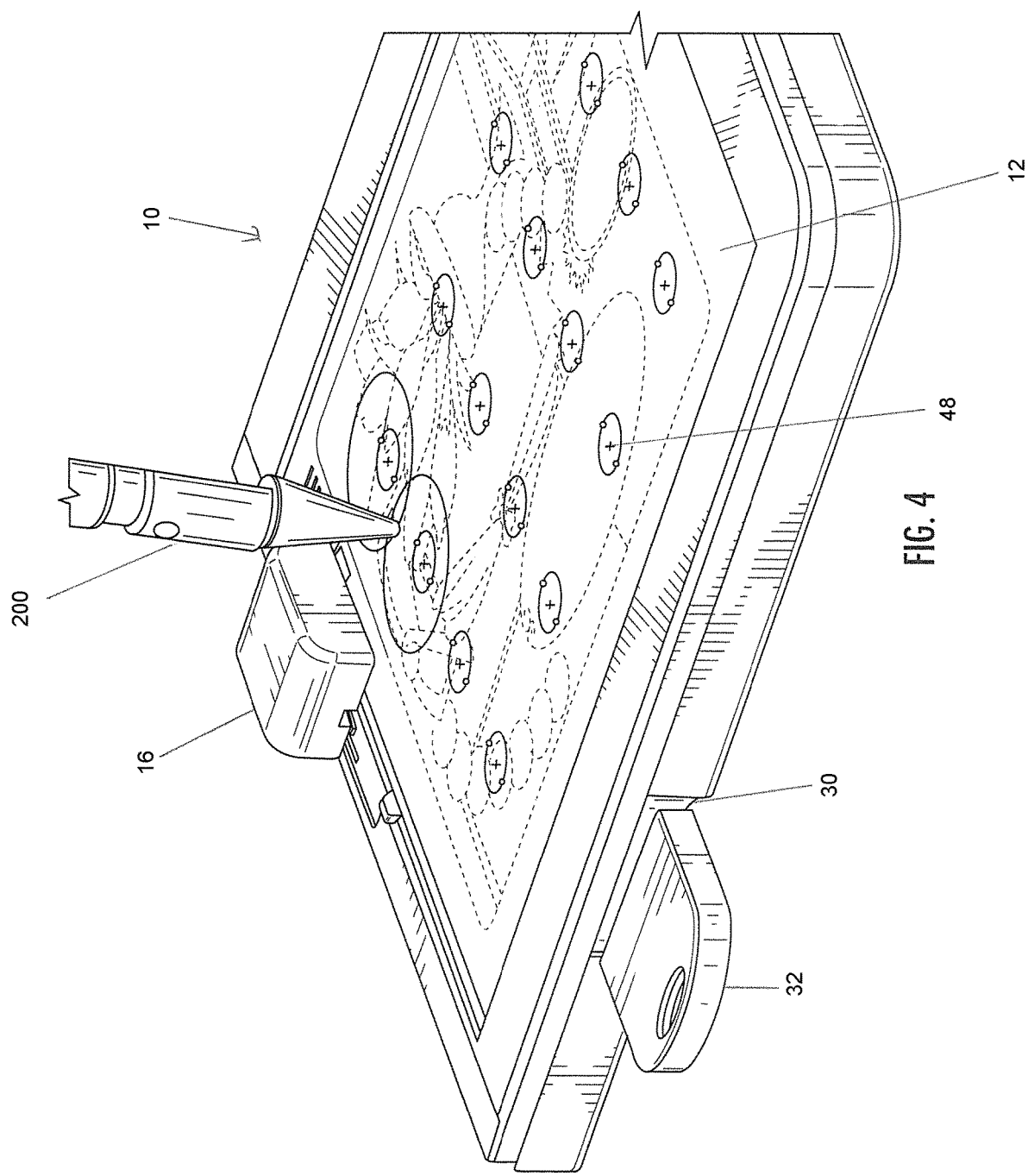
FIG. 4 is a perspective view of the interactive drawing tablet showing an array of emitters.
Figure 5:
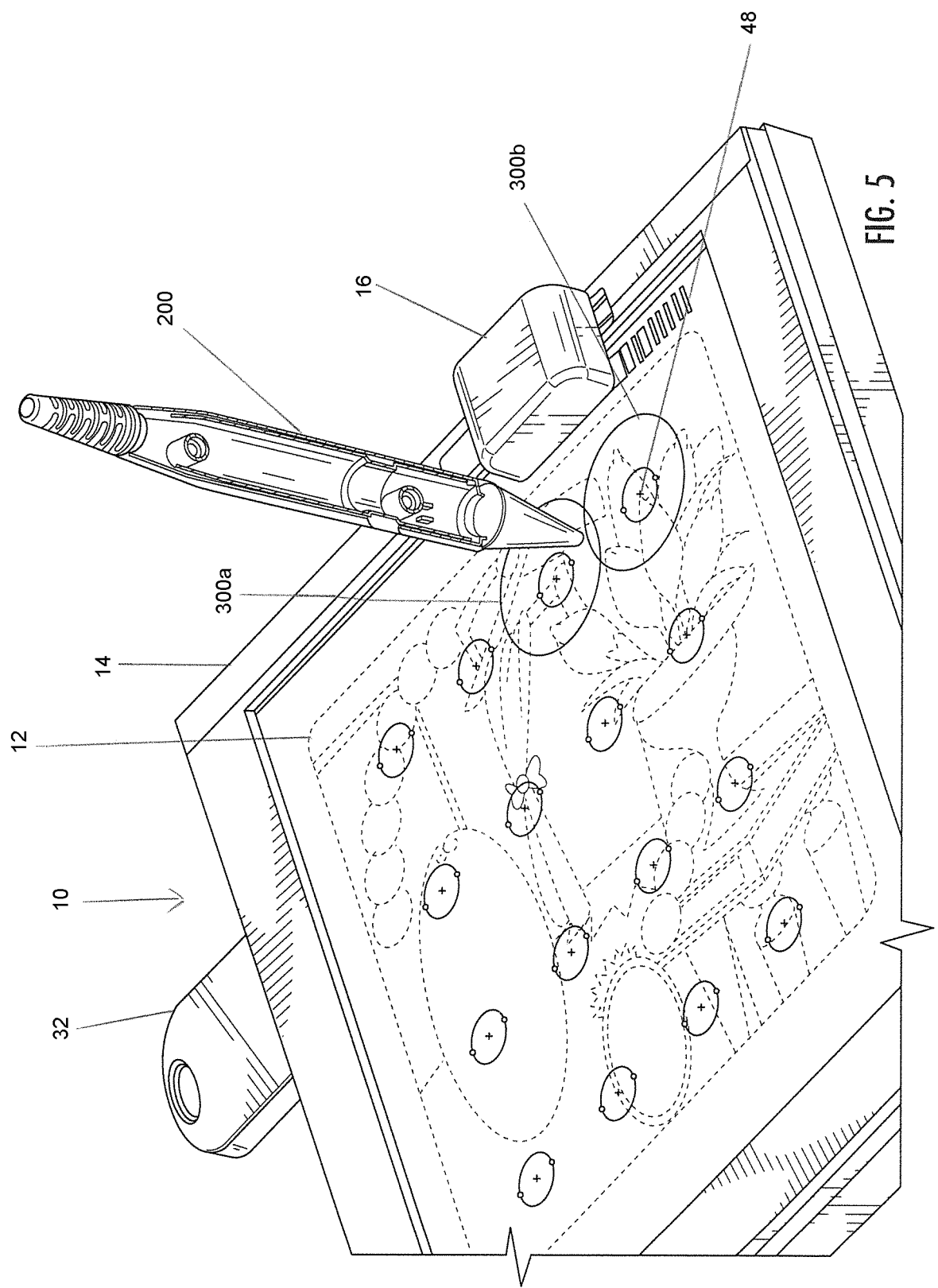
FIG. 5 is another perspective view of the interactive drawing tablet showing the array of emitters.
Figure 6:
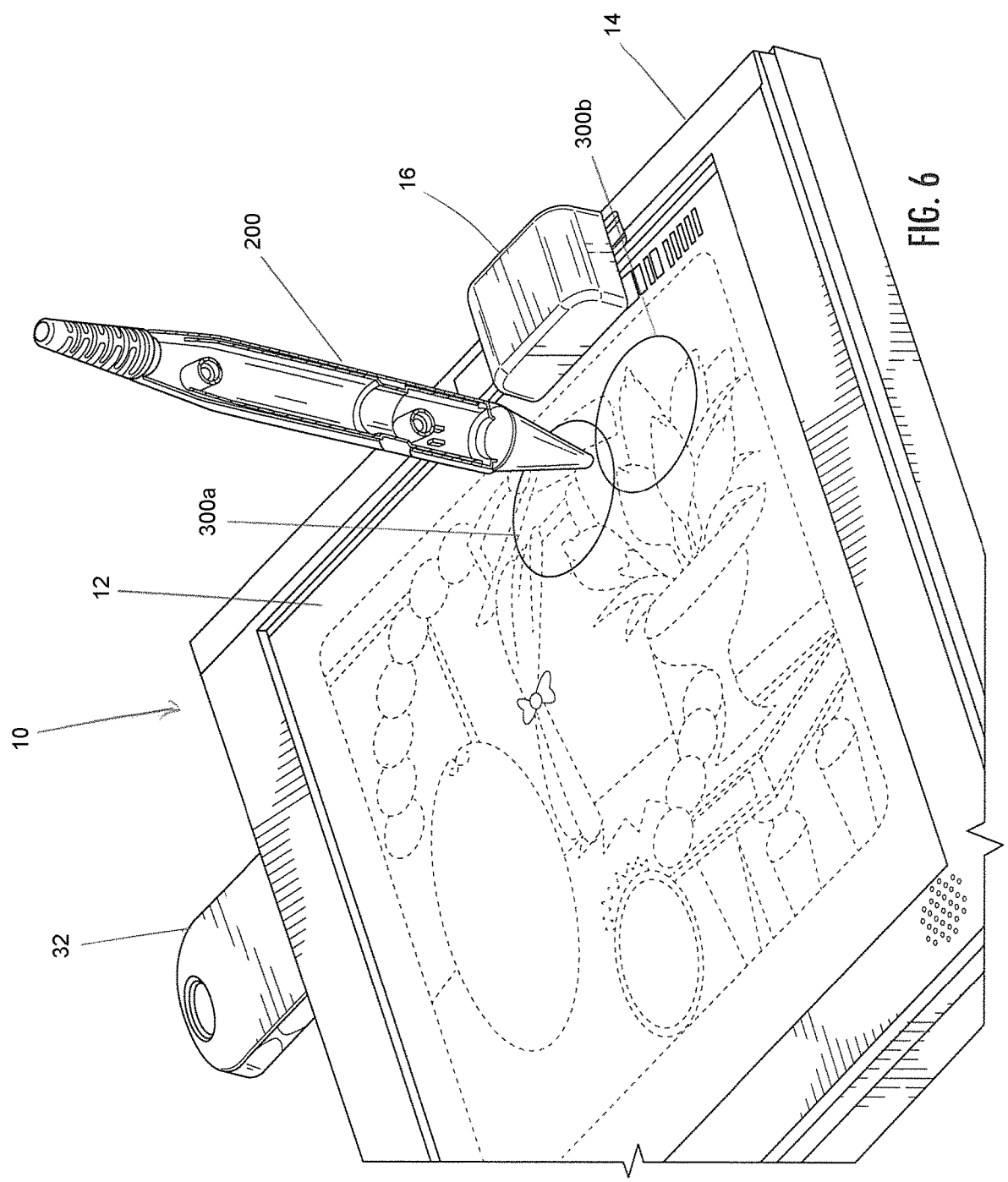
FIG. 6 is a perspective view of the interactive drawing tablet in which location zones are represented.
Figure 7:
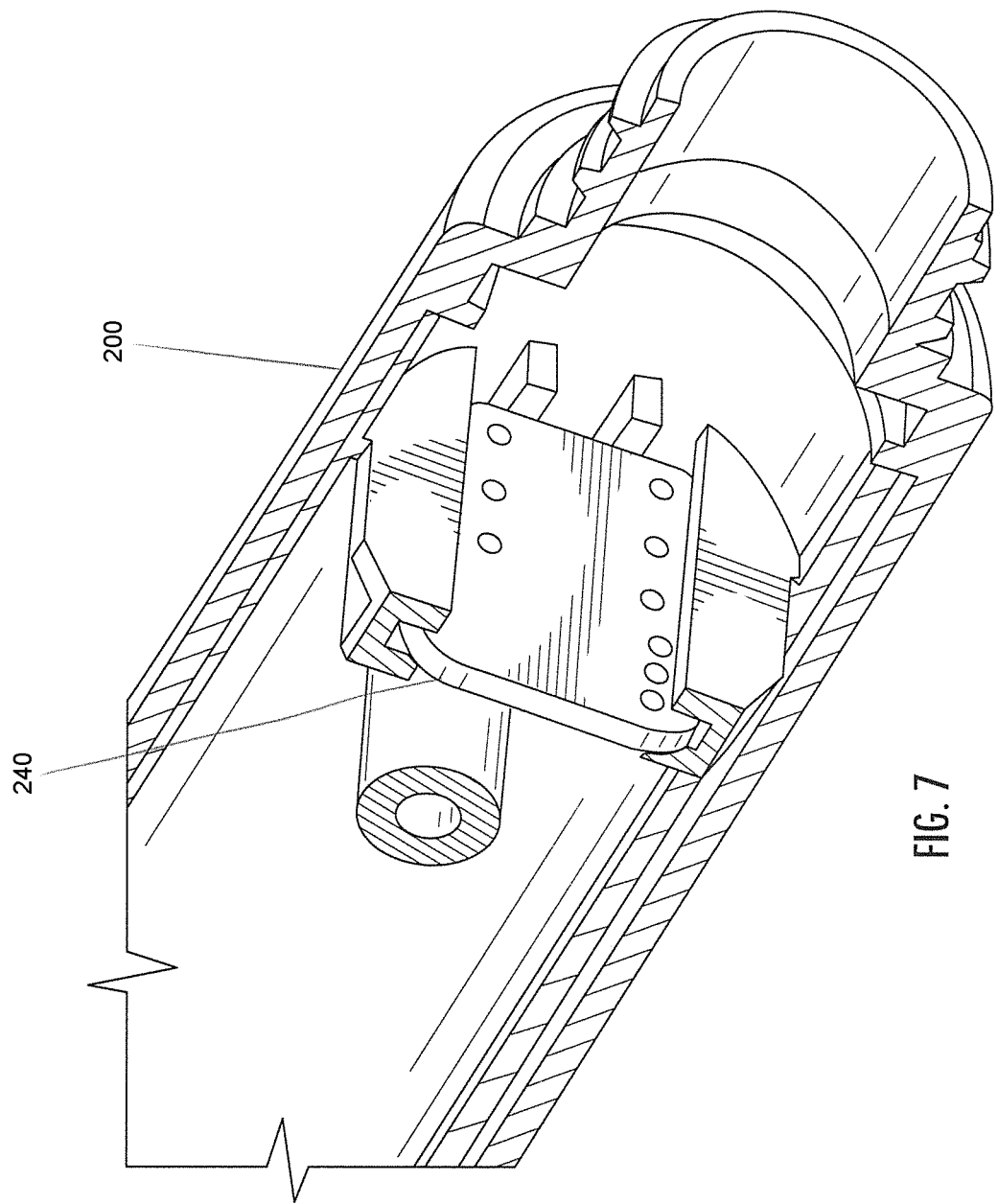
FIG. 7 is a cross-sectional view of the delivery device with an integrated circuit.
Figure 8:
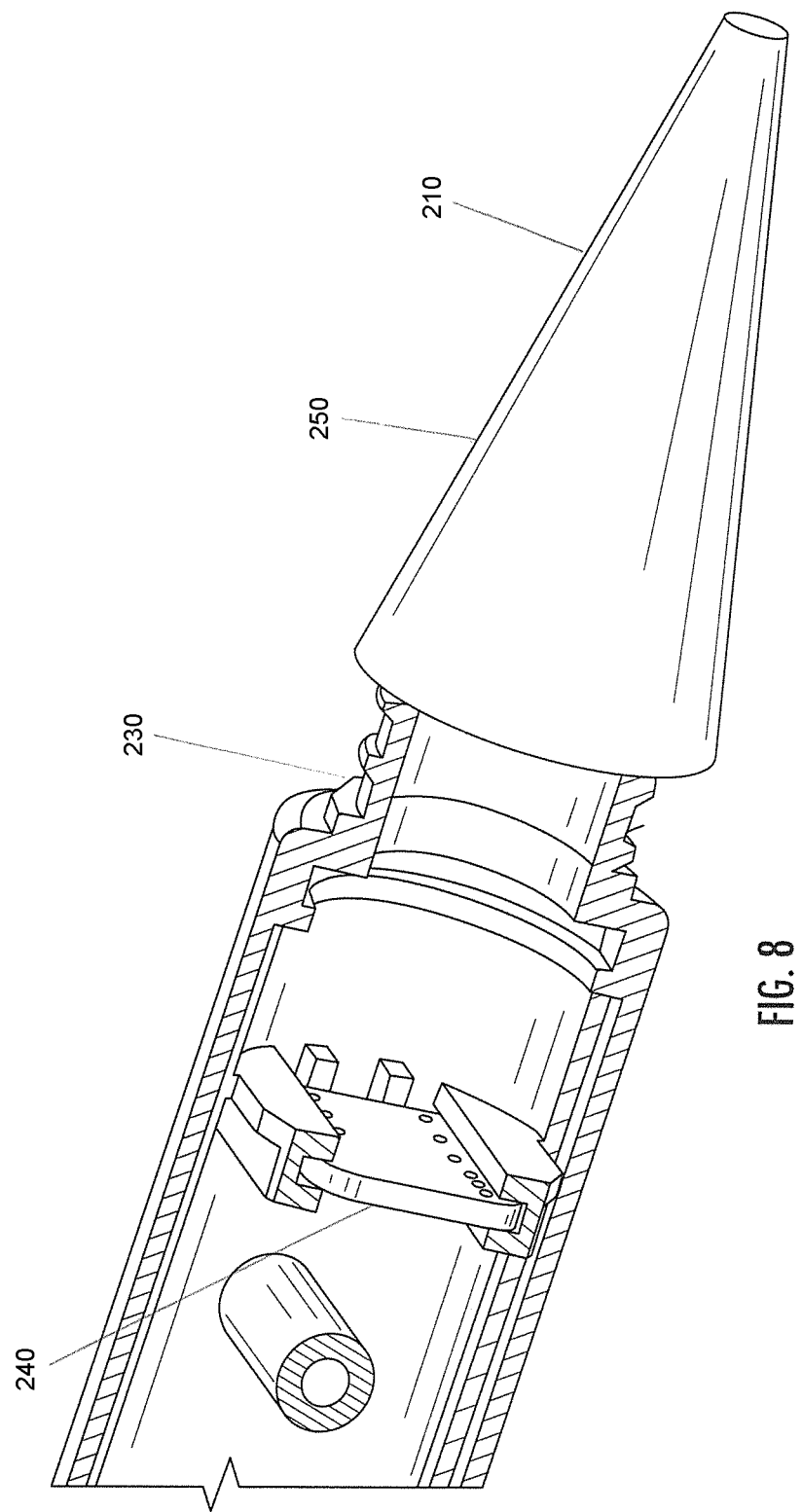
FIG. 8 is a cross-sectional view of the delivery device with the integrated circuit and a writing implement.
Figure 9:
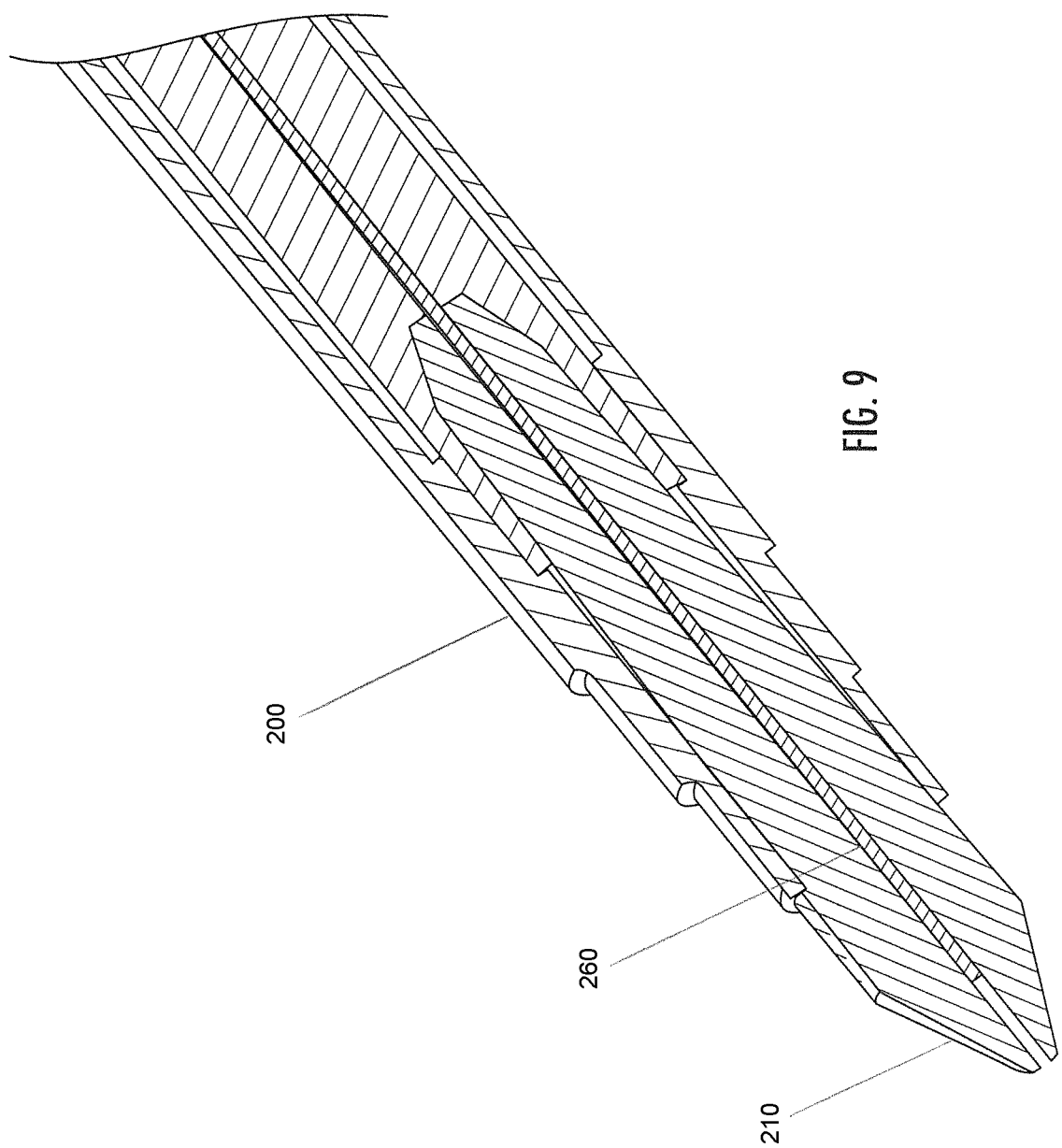
FIG. 9 is a cross-sectional view of the delivery device illustrating an optical channel.
Figure 10:
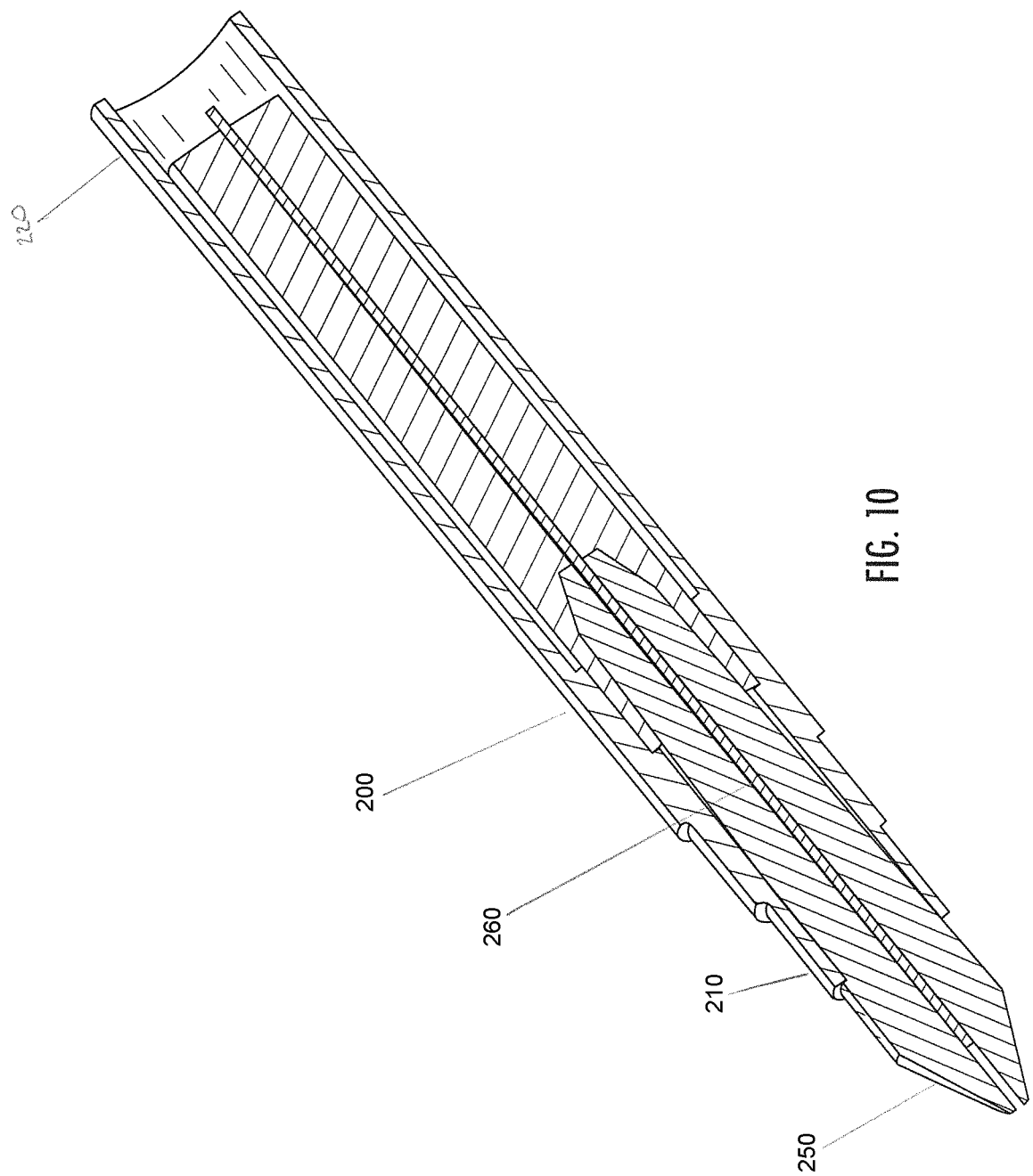
FIG. 10 is another sectional view of the delivery device illustrating the optical channel.
Figure 11:
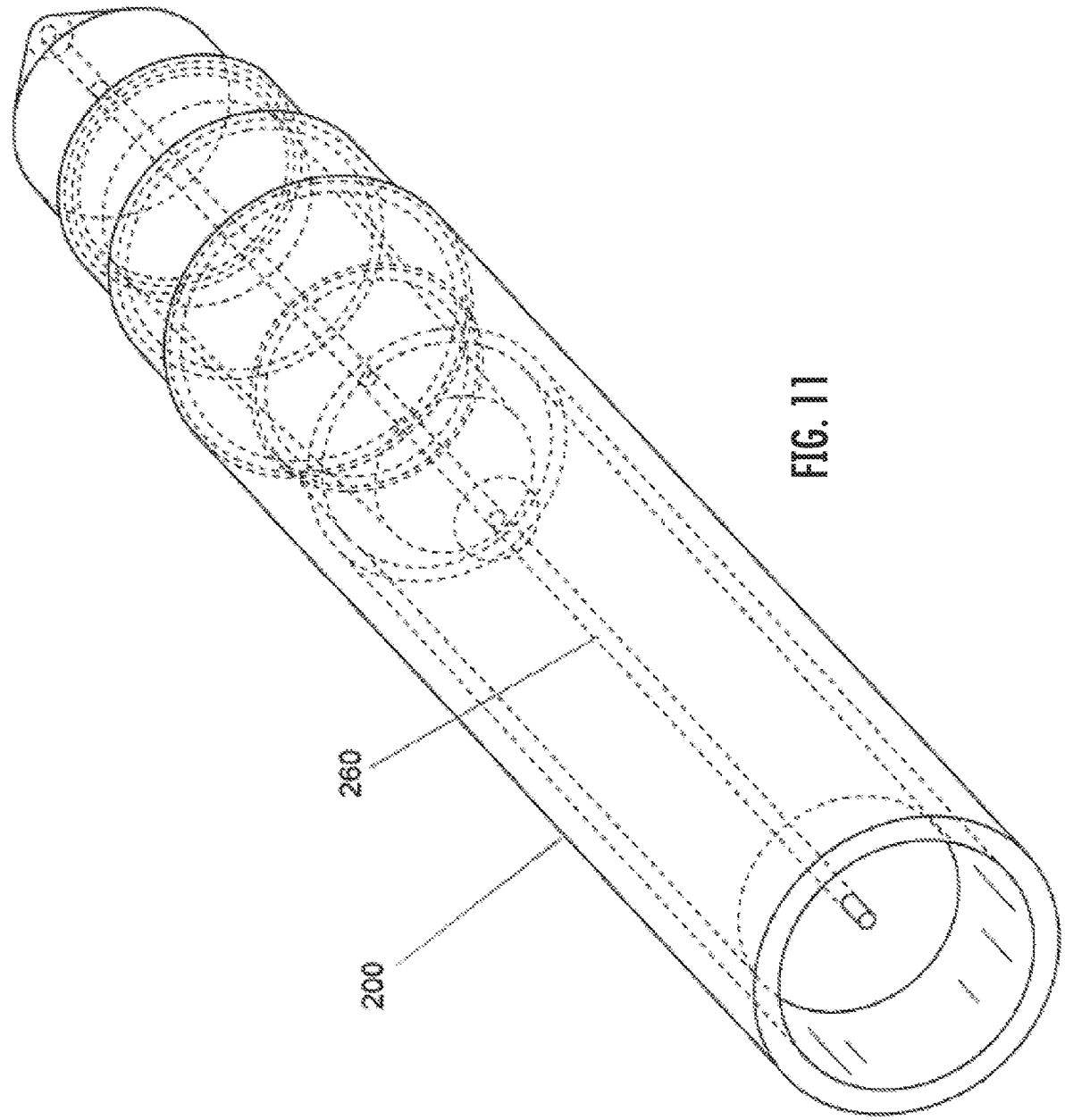
FIG. 11 is an alternate view of the delivery device and optical channel.
Figure 12:
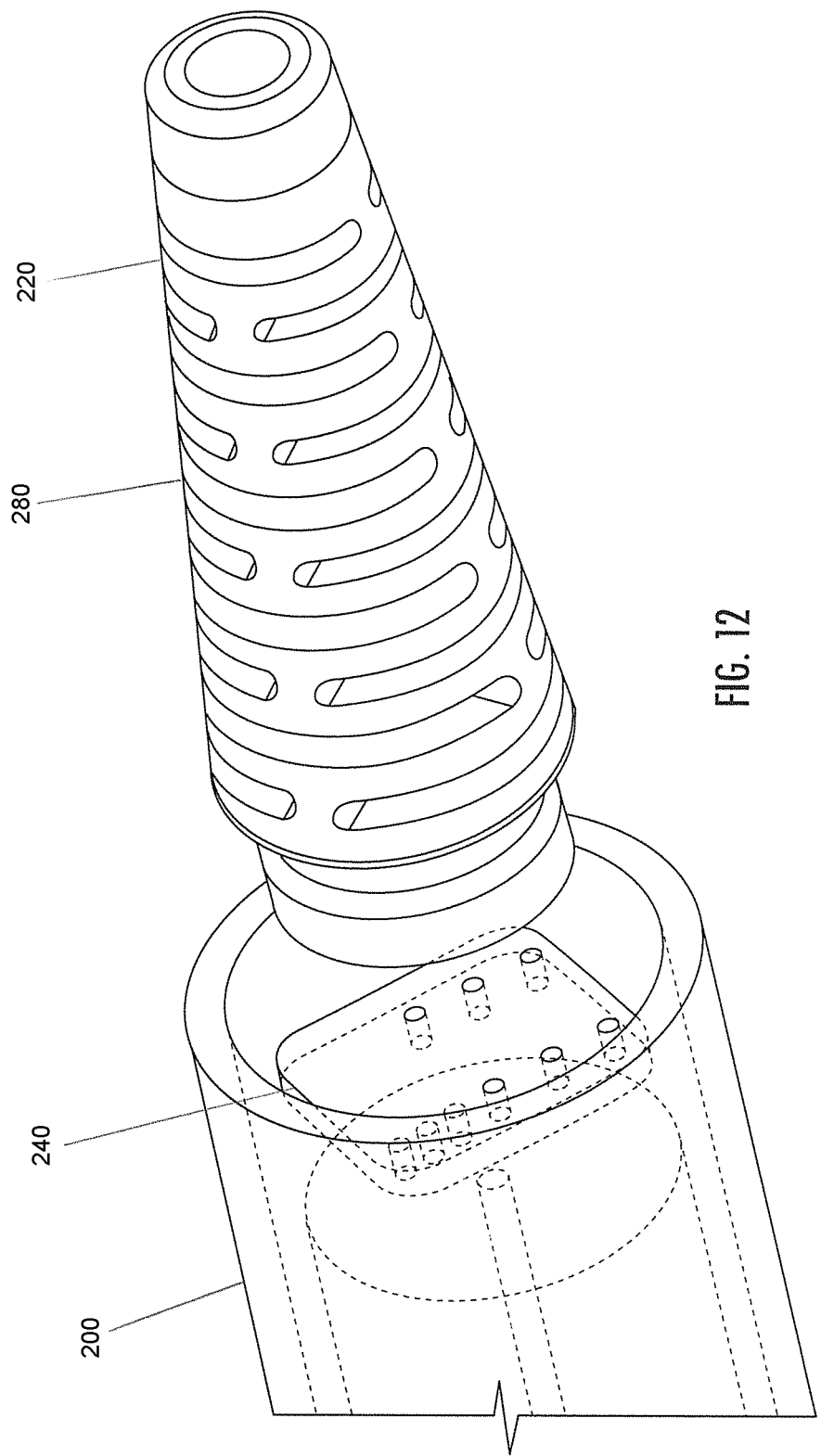
FIG. 12 is an alternate view of the delivery device and tether.
Figure 13:
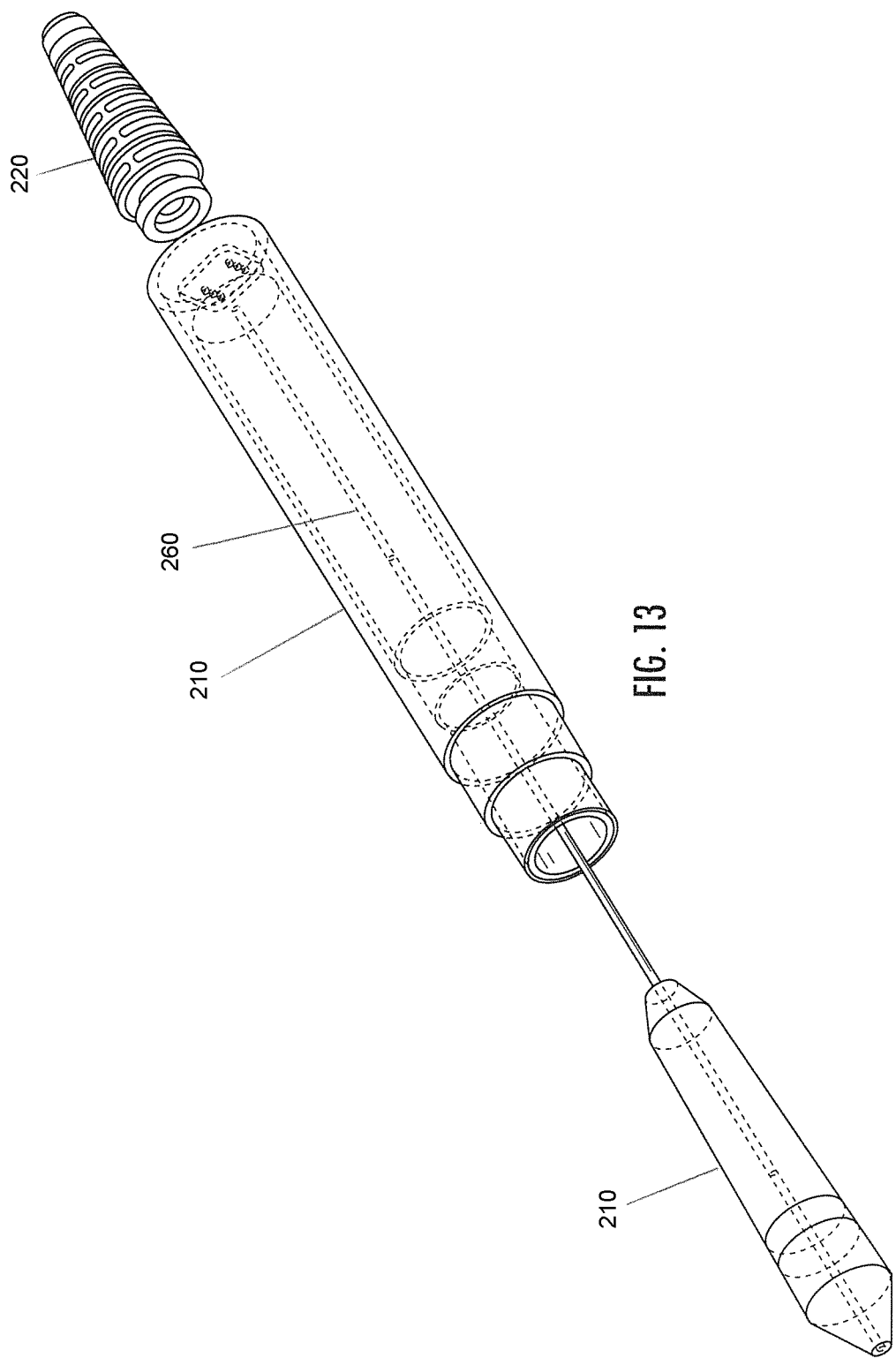
FIG. 13 is an exploded perspective view of the delivery device.
Figure 14:
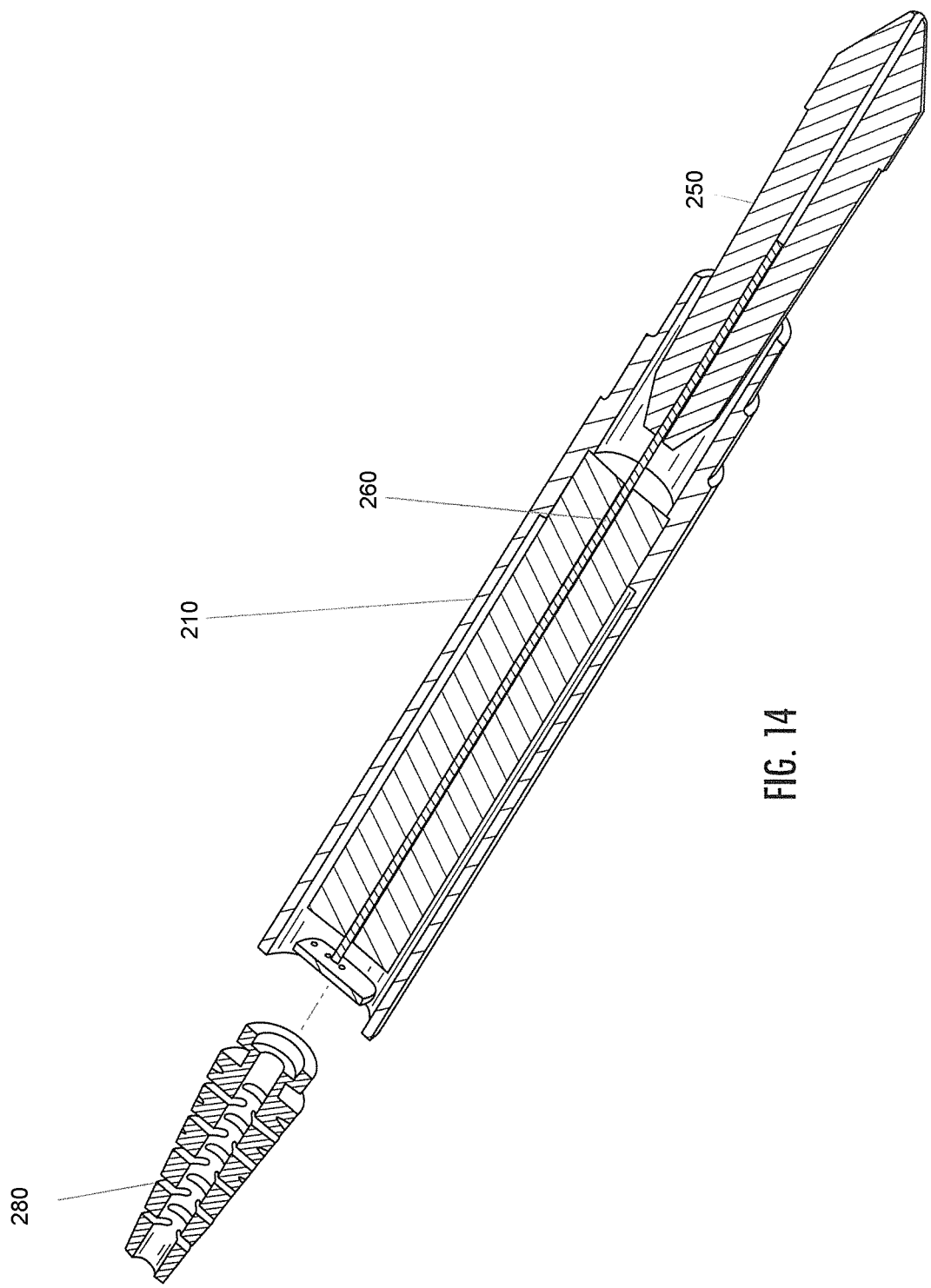
FIG. 14 is an exploded perspective cross-sectional view of the delivery device.
Figure 15:
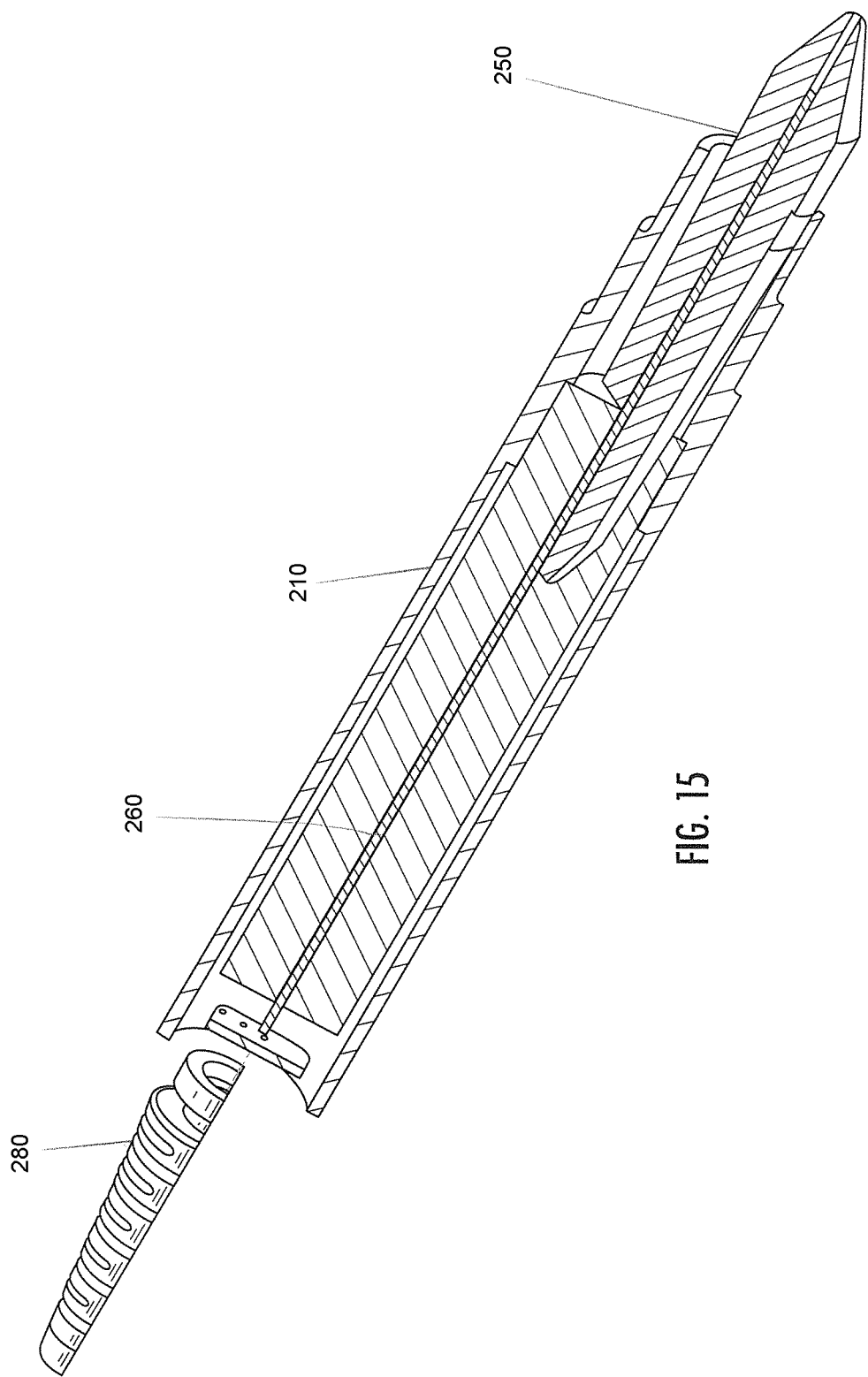
FIG. 15 is another exploded perspective cross-sectional view of the delivery device.

FIGS. 3 and 4 are side perspective views of the interactive drawing tablet 10. A memory port 30 is formed in the frame 14 of the interactive drawing tablet 10 and is configured to receive a memory module 32. The memory port 30 may be provided in any of the sides, edges, or surfaces of the interactive drawing tablet 10. The memory module 32 may include a database to store barcode information, identity information, audio media and other content associated with one or more coloring sheets 100. For example, a set of coloring sheets 100 (e.g., a number of coloring sheets related to flowers, animals, or popular characters) may be sold as a unit similar to a traditional coloring book. In this case, the memory module 32 may be configured to include information pertaining to each of the coloring sheets 100 in that set. The memory module 32 may be sold with a collection of coloring sheets 12 and writing implements 250 for use with the interactive drawing tablet 10. The memory module 32 may include read only (ROM) or random access (RAM) memory.

In addition to identification information, the memory module 32 further includes color zone information and additional content, such as the audio media associated with each color zone. The color zone information divides the picture into a plurality of areas or zones, particularly enclosed areas within the borders of the lines of the picture. In the example of the flowers shown in the drawings, a first zone 300a may correspond to a first group of flowers and a second zone 300b may correspond to a second group of flowers. Additional zones may correspond to the vase, the table, or other elements of the illustration. Each area or zone is enclosed by an outline or border to define the outline of the flowers. Therefore, the zone information not only includes the locational information to define the general border of the flower group, but also includes audio content specific to the identified zone on the identified page.

A memory device 50 may be configured to access the data stored in the removable memory module 32 when it is inserted in the memory port 30. The processor 42 is configured to access the data from the removable memory module 32 via the memory device 50. When a barcode 18 is read by the page identification device 16, the processor 42 uses the decoded barcode information to determine the identity of the coloring sheet 100 or other printed media from which the barcode 18 was obtained and associate content with the identified coloring sheet 100. Also, once the coloring page is identified, the processor 42 can access the color zone information related to the identified coloring sheet 100. The color zone information correlates to locations in the picture with respect to engaging the user in an interactive coloring experience that might be used to color the particular zone or area.

The emitters 48 are configured to provide signals, such as encoded near infrared signals, when a user activates the delivery system 200 or when the delivery system 200 is pressed against or held in close proximity to the drawing sheet located on the surface 12. In other embodiments, the delivery system 200 may be activated when the user activates a button or when the tip of the delivery system 200, or the writing implement 250 held therein is pressed against the coloring sheet 100. In response, the emitters 48 produce the signals that are detected by the delivery system 200. The delivery system 200 may receive signals from more than one emitter 48 in the array of emitting nodes. The received signals are forwarded to the processor 42. The processor 42 can process the signals to determine the location of the tip of the delivery system 200 when the delivery system 200 is in an active state. In some embodiments, signals from multiple emitters 48 may be received by the delivery system 200 simultaneously. Based on the strength of the signals obtained from the respective emitters 48 and the unique characteristics of the emitted signals, the processor 42 detects the location of the delivery system 200.

In practice, when a user selects a location on the coloring sheet 12 using the delivery system 200, the emitters 48 transmit their unique signals through the coloring sheet 100, and the optical channel 260 delivery system 200 detects the signals. The processor 42 receives the signals from the delivery system 200 and detects a location. The location is correlated to relevant color zone information to engage the user in an interactive coloring experience for that point (or other points within a zone). During the interactive coloring experience, the processor 42 sends an output signal to an output device, such as the speaker 26, which provides an audio media output to the user. For example, the audio output may include a spoken instruction, such as "What color are the flowers?" The particular audio output may also be stored in the removable memory module 32. The audio media may be stored as files including, but not limited to, .wav or midi files.

Figure 18:
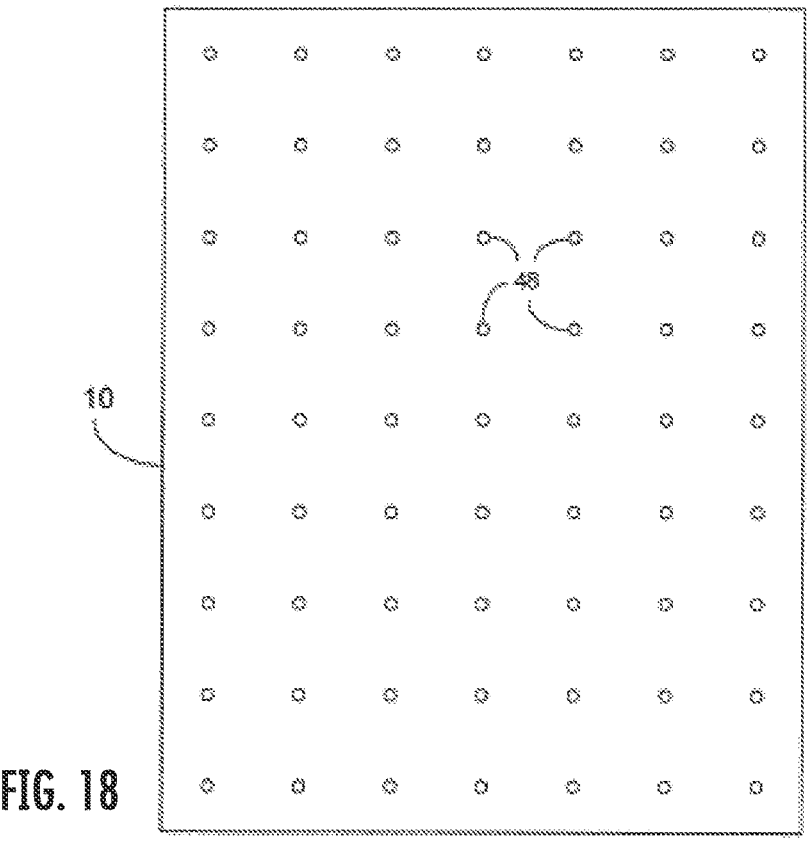
FIG. 18 is a schematic representation of an array of emitters of the interactive drawing tablet.

FIG. 18 is a view of an embodiment of the surface 12 on the coloring tablet 10. The surface 12 may be formed within the frame 14 shown in FIG. 1. The surface 12 may have dimensions that substantially match the outer dimensions of the coloring sheet 100 that is placed on the surface 12. Therefore, the coloring sheet will remain at a substantially fixed position on the surface when it is being colored. The emitters in FIG. 18 are arranged in an X-Y arrangement. The emitters 48 may be formed coplanar within a portion of the top surface of the surface 12 and exposed, or, in other embodiments, the emitters 48 may be formed slightly below the surface 12 in a position enabling the emitters to emit a signal through the coloring sheet 100 or other printed media.

According to various embodiments, the 2-dimensional array of emitters 48 may include any suitable number of rows and/or columns. In the illustrated example, the 2-dimensional array of emitters 48 includes nine rows and seven columns. The emitters 48 may be arrange in any suitable pattern, such as the rectangular pattern as shown, a circular pattern, a moiré rosette pattern, etc.

The emitted electromagnetic energy from the IR LED emitters 48 may have a wavelength of 940 nm and a spectral bandwidth at 50% of 50 nm. This type of infrared emitter is common in consumer products such as TV remote controls.

Normally, with respect to IR devices, a line of sight is needed between transmitter and receiver. The coloring sheet 100 may interrupt many transmitted IR signals. The transmitted IR is tuned to be available for reception at the point where the delivery system 200 touches or is in close proximity to the drawing media on the interactive drawing tablet 10 surface 12.

The emitting nodes on the surface of the interactive drawing tablet 10 have a substantially circular emission pattern. The printed media or coloring sheet 100 would be configured so that the circular emission pattern might fall within the features of a printed piece of component artwork (e.g., flowers in a vase on a table). When this zone is detected, a desired audio output can be produced.

Figure 16:
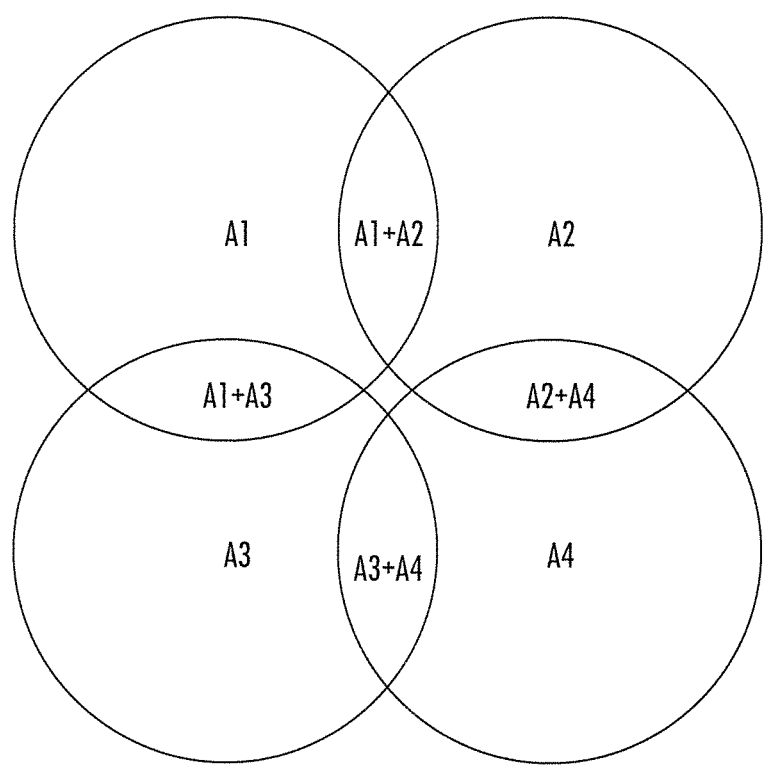
FIG. 16 is a schematic representation of emitting zones of the interactive drawing tablet.

In some instances, the delivery system 200 may be brought into proximity of the surface 12 at a position overlapped by adjacent emitters 48. FIG. 16 illustrates nodes or emitters 48 identified as A1, A2, A3, and A4. An area within the emission pattern of both A1 and A2 is identified as A1+A2. Through a process of constructive interference, the delivery system 200 in combination with the circuit 40 of the interactive drawing tablet 10, identifies the area A1+A2 and provides appropriate instructions for the area A1+A2. The signal emitted by each emitter 48 is selected so that the delivery system 200 and interactive tablet 10 can identify areas within more than one emission pattern.

The delivery system 200 may be electrically connected to the interactive drawing tablet 10 for receiving power from the tablet 10. However, in other embodiments, the delivery system 200 may be untethered and powered by its own power source (e.g., a battery) and could communicate to the interactive drawing tablet 10 via any suitable transmission protocol, such as radio frequency communications or line-of-sight infrared communications.

The presence of the delivery system 200 is detected once it receives a first data packet from one of the nodes in the two-dimensional array of IR emitters 48 through the coloring sheet 100 or printed media. The transmitted IR is tuned to be available for reception at the point where the drawing instrument touches or is in close proximity to the printed media on the interactive drawing tablet 10 surface (i.e., through the page of the drawing media). The radiation pattern and power are tuned to be available for reception just at the surface of the page or drawing medium.

A first drawing sheet is identified to the interactive drawing tablet 10 after the first identifier (e.g., barcode) is selected. In this way, the content on the drawing media (i.e., the coloring page) is "known" to the interactive drawing tablet 10 after its barcode has been scanned.

The encoded infrared electromagnetic energy is the IR transmission, transmitted through the drawing media which has a carrier wave on which data is modulated. The receiver receives the infrared electromagnetic energy, the carrier, and data, and decodes to output just data which in turn is further decoded by the computer in the interactive drawing tablet.

The drawing tablet 10 surface is made up of a planar two-dimensional array of infrared emitters. Each node in the array (i.e., a unique IR emitter 48) is programmed to emit a unique data code. The data can be encoded in a variety of modulation and transmission protocol schemes. A member may be one or more LEDs or nodes. A node refers to a location on the surface that is emitting unique location information and may include an X-component and a Y-component to identify its location (e.g., x3, y4). A node is a point, or an intersection of coded emissions at union at which lines or pathways intersect such as the row-column arrangement of LEDs that make up the IR LED array.

The coloring sheet 100 or printed media is a specially selected sheet and may include paper of a particular weight. The sheet can be transmissive with respect to IR radiation (and visible radiation). In other words, the sheet can be translucent, allowing some light to penetrate therethrough. When the LED light is transmitted, the light will be visible on the other side of the sheet. The stylus might act as an optical channel when it is touching the sheet or positioned extremely close to the sheet.

Pulse position modulation, pulse width modulation, and bi-phase coding are modulation schemes for transmitting data. They may be used in remote data communication with low bandwidth applications. The interactive drawing device can read singular and multiple sources of encoded data. In some cases, such as, but not limited to the case of pulse position modulation, interference of the output of any two or more IR LEDs may interfere constructively, providing unique data at their union, which means that the stylus can effectively receive data packets from multiple emitters simultaneously. The processor can process these signals to infer a position on the drawing tablet drawing surface based on the reception of multiple data packets. This effectively doubles the resolution of position location on the drawing surface through the drawing medium.

A system or method may be provided for sensing uniquely coded electromagnetic information in the near infrared range emanating from a node in a multi-node 2-dimensional array through the print media on and from the print media system. A system or method may be provided for encoding the drawing sheet. It may include an array of electrical elements underneath the surface of a base unit. It also may include an interactive apparatus wherein the marking instrument includes a sensor particularly tuned for receiving uniquely coded electromagnetic radiation in the near infrared range.

The system or method may include an optical sensor (image sensor device) for sensing electromagnetic radiation in the infrared spectrum It may also include a light source or sources that emits electromagnetic radiation at some or all of the wavelengths to which the sensor device responds. An image senor may include one or more photodiodes, phototransistors, infrared integrated receivers, charge coupled devices (CCD) or Complementary Metal Oxide Semiconductor (CMOS) image sensors. The sensors 48 may be uniquely tuned to operate in Near Infrared electromagnetic radiation wavelengths (~740 nm-950 nm).

A system or method may be provided to include a book having at least one page with a printed page code, such as a barcode. The system includes an optical sensor for reading the code. Data from the code is processed by a processor to decode the page data.

A system or method may be provided for sensing uniquely coded electromagnetic information in the near infrared range emanating from a node or nodes in a multi-node array through the print media on and from the print media system and for encoding the drawing sheet. It may use an electronic map that correlates print elements in the print medium with their locations in the print medium when the print medium is disposed on the surface.

In one embodiment, a marking system may comprise a marking instrument comprising a body, an optical channel mounted to the body, a receiver for receiving and decoding encoded infrared electromagnetic energy, and a transmitter for transmitting visible electromagnetic energy through at least a portion of the optical channel. The marking system may also comprise an emission source spaced from the marking instrument and operably configured to emit uniquely encoded infrared electromagnetic energy.

A method may be provided for communicating information to a user of a marking instrument. The method may comprise the steps of providing a marking implement comprising a body, a data reception and decoding device, an optical channel, and a spaced emission source comprising a two-dimensional array of emitters operably configured to transmit infrared electromagnetic energy encoded with unique data packets. The method may include transmitting the infrared electromagnetic energy encoded with unique data packets from the emitters of the emission source. The method may include moving the marking implement over one of the emitters of the spaced emission source, and receiving and decoding the infrared electromagnetic energy encoded with unique data packets.

The implementations described herein represent a number of possible implementations and examples and are not intended to necessarily limit the present disclosure to any specific implementations. Instead, various modifications can be made to these implementations as would be understood by one of ordinary skill in the art. Any such modifications are intended to be included within the spirit and scope of the present disclosure.

What is claimed is:

1. An interactive drawing tablet, comprising:
   a tablet having a housing enclosed by a frame, the housing including at least one surface formed within the frame;
   a delivery device electrically coupled to the tablet, the delivery device including at least a first end and a holding portion at least partially open at the first end, and an optical channel extending through the delivery device and exposed at the first end;
   a writing implement held in the holding portion;
   a memory port formed in the tablet and configured to receive a memory module;
   a plurality of emitters embedded in the surface of the tablet, the plurality of emitters emitting signals readable by the optical channel in the delivery device; and
   a coloring sheet mounted on the surface of the tablet, the coloring sheet having a first surface in contact with the surface of the tablet and a second surface opposite the first surface, the first and second surfaces being continuous between outer edges of the coloring sheet, wherein
   the signals emitted by the plurality of emitters are emitted through the first and second continuous surfaces of the coloring sheet and readable by the delivery device through the coloring sheet.

2. The interactive drawing tablet of claim 1, wherein each of the plurality of emitters emits a unique signal.

3. The interactive drawing table of claim 2, wherein the unique signals emitted by each of the plurality of emitters corresponds to a location on the coloring sheet.

4. The interactive drawing tablet of claim 2, wherein the memory module stores identifying information of the coloring sheet, including barcode identification information and color information relating to areas of the coloring sheet corresponding to each of the plurality of emitters.

5. The interactive drawing tablet of claim 2, further comprising a speaker for emitting audio media, wherein
the optical channel of the delivery device receives a signal from at least one of the emitters of the plurality of emitters, and the speaker emits pre-recorded audio media based on the signal received from the at least one of the emitters of the plurality of emitters.

6. The interactive drawing tablet of claim 1, further comprising:
a page identification device, wherein
a barcode is formed on the coloring sheet and the page identification device is configured to read the barcode.

7. The interactive drawing tablet of claim 6, wherein the page identification device is slidably mounted in a groove formed in the frame of the tablet, and the page identification device is slid within the groove to move over the barcode in a side-to-side direction.

8. The interactive drawing tablet of claim 1, wherein the plurality of emitters are configured in a two-dimensional array, with the plurality of emitters equally spaced from one another.

9. The interactive drawing table of claim 8, wherein an emission pattern of each of the plurality of emitters at least partially overlaps with emission patterns of adjacent ones of the plurality of emitters, and signals emitted by adjacent ones of the plurality of emitters constructively interfere with one another to emit a unique signal identifiable by the delivery device.

10. The interactive drawing tablet of claim 1, further comprising:
an integrated circuit mounted in the delivery device and electrically coupled to the delivery device to process the signals emitted by the plurality of emitters.

11. The interactive drawing tablet of claim 1, wherein the plurality of emitters are infrared radiators.

12. The interactive drawing tablet of claim 1, wherein each of the plurality of emitters emits a substantially circular emission pattern.

13. An interactive drawing tablet, comprising:
a tablet having a housing enclosed by a frame, the housing including at least one surface formed within the frame;
a delivery device electrically coupled to the tablet, the delivery device including at least a first end and a holding portion at least partially open at the first end, and an optical channel extending through the delivery device and exposed at the first end;
a writing implement held in the holding portion;
a memory port formed in the tablet and configured to receive a memory module;
a plurality of emitters embedded in the surface of the tablet, the plurality of emitters emitting signals readable by the optical channel in the delivery device;
a page identification device slidably mounted in a groove formed in the frame of the tablet; and
a coloring sheet mounted on the surface of the tablet and a barcode formed on the coloring sheet and readable by the page identification device, wherein
the page identification device is slid within the groove to move over the barcode in a side-to-side direction.

14. The interactive drawing tablet of claim 13, wherein each of the plurality of emitters emits a unique signal.

15. The interactive drawing table of claim 14, wherein the unique signals emitted by each of the plurality of emitters corresponds to a location on the coloring sheet.

16. The interactive drawing tablet of claim 13, wherein the signals emitted by the plurality of emitters are readable by the delivery device through the coloring sheet.

* * * * *